United States Patent [19]

Alaoui

[11] Patent Number: 6,048,036
[45] Date of Patent: Apr. 11, 2000

[54] HUB-CAP FOR A VEHICLE WHEEL

[76] Inventor: Mrani Mustapha Alaoui, 20, rue de la Navigation, CH-1201 Geneva, Switzerland

[21] Appl. No.: 09/125,248

[22] PCT Filed: Feb. 14, 1997

[86] PCT No.: PCT/CH97/00049

§ 371 Date: Sep. 24, 1998

§ 102(e) Date: Sep. 24, 1998

[87] PCT Pub. No.: WO97/29918

PCT Pub. Date: Aug. 21, 1997

[30] Foreign Application Priority Data

Feb. 14, 1996 [CH] Switzerland ................. 380/96

[51] Int. Cl.$^7$ ...................................................... B60B 7/04
[52] U.S. Cl. ................. 301/37.1; 301/37.25; 301/37.37; 301/108.4; 301/37.42
[58] Field of Search ............... 301/37.25, 37.37, 301/108.1, 108.4, 108.3, 108.5, 37.27, 37.42

[56] References Cited

U.S. PATENT DOCUMENTS

| 2,280,584 | 4/1942 | Horn | 301/108.4 |
| 2,997,344 | 8/1961 | Whiteman | 301/108.1 |
| 4,123,111 | 10/1978 | Renz et al. | 301/108.1 |
| 4,280,293 | 7/1981 | Kovalenko et al. | 301/37.25 |
| 4,929,030 | 5/1990 | Park | 301/37.25 |
| 5,016,944 | 5/1991 | Schultz | 301/108.1 |
| 5,190,354 | 3/1993 | Levy et al. | 301/37.25 |
| 5,490,342 | 2/1996 | Rutterman et al. | 301/37.25 |
| 5,588,715 | 12/1996 | Harlen | 301/37.25 |
| 5,659,989 | 8/1997 | Hsiao et al. | 301/37.25 |
| 5,707,113 | 1/1998 | Russell | 301/108.4 |

FOREIGN PATENT DOCUMENTS

| 0087607 | 9/1983 | European Pat. Off. . |
| 0466622 | 1/1992 | European Pat. Off. . |
| 8807263 | 12/1988 | Germany . |

*Primary Examiner*—S. Joseph Morano
*Assistant Examiner*—Long Bao Nguyen
*Attorney, Agent, or Firm*—Ostrolenk, Faber, Gerb & Soffen, LLP

[57] ABSTRACT

A device for attaching and supporting a hub-cap on the hub or rim (1) of a vehicle wheel, comprising a cylindrical body (4) with a base (3) located at one end thereof and provided with a frustoconical shoulder (31) for engaging the heads of the wheel-mounting boltss (2), while the other end of said body is provided with a cover (43) for attaching the hub-cap (6).

8 Claims, 1 Drawing Sheet

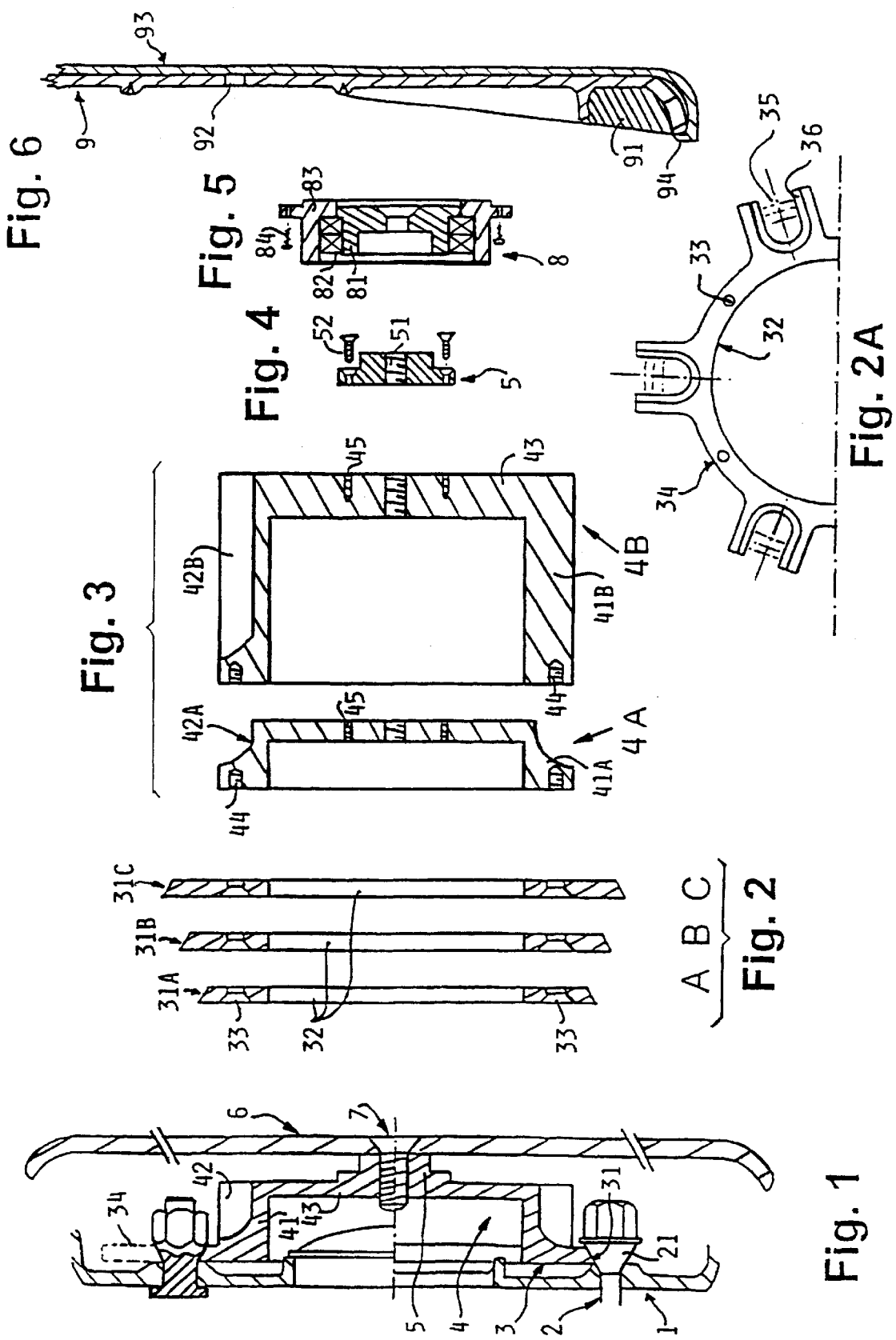

HUB-CAP FOR A VEHICLE WHEEL

BACKGROUND OF THE INVENTION

The present invention is in the field of motor vehicle accessories and relates more specifically to wheel hub-caps.

The wheels of most vehicles are fitted with decorative plates covering the hubs of the wheels, one of the purposes of which plates is to avoid the wheel-mounting bolts becoming dirty. In some cases, it has already been proposed that these plates be used as advertising supports. When the decorative element carries an advertising slogan it is contrived for the plate to remain in a predetermined position, especially when the vehicle is stationary, that is to say when an on-looker can view the advertising slogan at leisure.

In European patent 0 466 622 in the name of the applicant, there is described such a hub-cap which consists, on the one hand, of an attaching and support device secured to the hub or rim and, on the other hand, of a screen element mounted on said device in rotation. This screen element has an asymmetric distribution of its mass so that it always remains in a fixed angular position with respect to the horizontal.

The problem raised by this type of embodiment is that the attaching and support device has to be adapted to each type of wheel. The object of the present invention is to provide a device for attaching and supporting a hub-cap which can be readily adapted to any type of wheel.

SUMMARY OF THE INVENTION

This device is characterized by a cylindrical body with a base located at one end thereof and provided with a frustoconical shoulder for engaging the heads of the wheel-mounting bolts, while the other end of said body is provided with a cover for attaching said hub-cap.

In a preferred alternative form, the base and the cylindrical body consist of modular elements.

The invention also extends to a method for manufacturing a wheel hub-cap support and attaching device, wherein a molded part in which the base and the lateral cutouts corresponding to the wheel to be equipped is produced. It also extends to a method of manufacture wherein modular elements are combined to suit the dimensions of the wheel to be equipped.

The appended drawing depicts, by way of non-limiting examples, some embodiments of the subject of the invention.

BRIEF DESCRIPTION OF THE DRAWINGS

FIG. 1 is a cross section of part of the rim of a wheel, on which a device for attaching and supporting the hub-cap is held by the wheel-mounting nuts.

FIGS. 2 to 4 depict, in cross section, alterative forms of a device for attaching and supporting the hub-cap, in an embodiment with modular elements. More specifically:

FIG. 2 depicts three alternative forms A, B and C of base plates for such a device.

FIG. 2A depicts another alternative form of a base plate.

FIG. 3 proposes two alternative forms A and B of a cylindrical cover.

FIG. 4 shows a hub-cap support.

FIG. 5 is a cross section of a ball bearing used in specific instances.

FIG. 6 is a cross section through a hub-cap with asymmetric distribution of mass.

DESCRIPTION OF THE PREFERRED EMBODIMENT

In the overall view of FIG. 1, the rim 1 of a vehicle and the wheel-mounting bolts 2 have been depicted diagrammatically. These mounting bolts have a frustoconical part 21 intended to fit into a corresponding opening in the wheel.

In order to hold the device according to the invention in place, a base 3 which externally has a frustoconical shoulder 31 is provided at its end that faces the wheel rim.

The base 3 is extended by a cylindrical body 4 forming a cover, the wall 41 of which has cutouts 42 for the passage of the wrench for tightening the bolts 2 and the bottom 43 of which consists of a cheek intended to interact, at least indirectly, with the hub-cap according to the invention.

In the alternative form depicted in FIG. 1, the bottom 43 comprises a raiser 5 intended to take a hub-cap 6, which is attached thereto, for example, by means of a central screw 7. It will be noted in this figure that the base 3, the cylindrical body 4 and the raiser 5 are manufactured as a single piece. It may be envisaged for this piece to be mass-produced and machined later to suit each particular case, as far as the positioning and number of lateral machinings constituting the cutouts 42, and the exterior dimensions of the base 3 are concerned.

In a preferred embodiment, these various components consist of independent modular components which can be combined as need be. As depicted in FIG. 2, it is possible to have bases which consist of a roundel A, B or C, the respective frustoconical shoulder 31A, 31B or 31C of which is produced on increasing diameters to suit the standard diameters of wheel rims. The central cutout 32 intended to receive the protruding central part of the wheel rim, and the passages 33 for the elements for attaching the base 3 to the cylindrical body 4 can be seen in the drawing.

The alternative form of base plate in FIG. 2A has four or five cutouts 35 comprising, on their periphery, a frustoconical shoulder 36 intended to take the bolts or nuts 21 for securing the rim. The alternative form of FIG. 2A allows a use for several types of wheels which have mounting-bolt locations on different diameters.

Depicted in FIG. 3 are two cylindrical bodies 4A and 4B of different depths, but it goes without saying that other alternative forms allowing the hub-cap support to be adapted to any type of wheel may be provided, as need be. On the face opposite the base, each cylindrical body has tapped passages 44 intended to take the base-attaching screws. On the opposite face, each further comprises tapped passages 45 intended for the attaching of the hub-cap. It will be noted that the cylindrical body 4A comprises a cutout 42A around the entire periphery of the part, while the cylindrical body 4B comprises a series of axial cutouts 42B, just one of which is visible in the drawing, these cutouts allowing the passage of the wrench intended for tightening the assembly onto the vehicle wheel.

FIG. 4 depicts the hub-cap raiser or support 5 which has just been screwed by screws 52 into the bottom 43 of the cylindrical body 4A or 4B chosen to suit the particular shape of wheel to be equipped. As already mentioned, this support comprises a tapped central passage 51.

Depicted diagrammatically in FIG. 5 is a ball bearing 8 comprising an inner part 81 intended to be screwed to the support 5, by means of a screw which has not been depicted in the drawing engaging with the tapped passage 51. The elements 82 constitute the bearing proper. The outer part 83 will be fixed by means of screws 84 in the hub-cap 9 depicted in FIG. 6.

The hub-cap 6 depicted in FIG. 1 is stationary with respect to the device described, while the hub-cap 9 in FIG. 6 comprises, on part of its periphery, a weighted part 91 intended to hold the hub-cap in a predetermined position irrespective of the position of the wheel.

At its center the hub-cap has a hole 92 intended for the passage of the tightening key. Advertising supports may be applied directly to the hub-cap 9 or to an attached part 93 clipped onto the hub-cap using an attaching stud 94.

The embodiment with the modular elements which are depicted in FIGS. 2 to 6 allows easy production of the support corresponding to the wheel to be equipped, but it is obvious that any alternative form is envisagable without departing from the scope of the present invention.

I claim:

1. A device for attaching and supporting a hub-cap on a hub of a vehicle wheel, comprising:

a cylindrical body having opposite first and second ends;

a base at the first end of the body, the base having an outward edge region and having frustoconically-shaped shoulders at the edge region, the shoulders being shaped and placed to accommodate the heads of wheel mounting bolts that are used to apply the hub-cap to the hub of the wheel;

a cover at the second end of the body, the cover being for attachment of the hub-cap thereto;

the cylindrical body having a periphery with cut-outs defined therein, the cut-outs being placed and shaped to allow a bolt-tightening wrench to pass by the cut-outs to the wheel mounting bolts at the frustoconical shoulders of the base.

2. The attaching device of claim 1, further comprising wheel mounting bolts for applying the hub-cap to the hub of the wheel, each bolt having a head for engaging a respective one of the shoulder as the bolt applies the hub-cap to the hub.

3. The attaching device of claim 1, wherein the cover includes a support thereon for the hub-cap; and each of the base, the cylindrical body and the hub-cap support comprises a separate modular element, the modular elements being selectively attachable together to assemble the attaching device and being separable from one another.

4. The attaching device of claim 3, wherein there is a respective first set of bases as modular elements, a respective second set of bodies as modular elements, and a respective third set of hub-cap supports as modular elements;

a respective one of the first set of bases, a respective one of the second set of bodies and a respective one of the third set of hub-cap supports, as modular elements, are assembled together, wherein the bases, the bodies and the supports of the sets thereof have different respective dimensions for the devices which are attached on various different wheel hubs and rims and hub-caps, and the modular elements of the respective sets being selected and combined for matching to the dimensions of the wheel hub to be equipped with the attaching device.

5. The attaching device of claim 1, further comprising a plurality of radially outwardly open cut-outs on the edge region of the base at corresponding locations to wheel nuts or wheel bolts at the hub of the vehicle wheel on which the base is disposed; each of the cut-outs having an internal periphery and the frustoconically shaped shoulder for each of the bolts being positioned on the internal periphery of the cut-out.

6. The attaching device of claim 1, further comprising an attached part for exhibiting information thereon, the attached part including an attaching piece designed to hold the attached part on the hub-cap, and the hub-cap being attached to the cover over the body.

7. The attaching device of claim 6 further comprising a ball bearing on the support for the hub-cap and further comprising a hub-cap on the support.

8. The attaching device of claim 7, wherein the hub-cap includes asymmetric distribution of mass therein which maintains orientation of the hub-cap after rotation of the support with the wheel rim.

* * * * *